United States Patent
Lutfi

(10) Patent No.: US 11,966,851 B2
(45) Date of Patent: Apr. 23, 2024

(54) CONSTRUCTION OF A MACHINE LEARNING MODEL

(71) Applicant: International Business Machines Corporation, Armonk, NY (US)

(72) Inventor: Aoun Lutfi, Dubai (AE)

(73) Assignee: International Business Machines Corporation, Armonk, NY (US)

(*) Notice: Subject to any disclaimer, the term of this patent is extended or adjusted under 35 U.S.C. 154(b) by 499 days.

(21) Appl. No.: 16/372,474

(22) Filed: Apr. 2, 2019

(65) Prior Publication Data

US 2020/0320404 A1 Oct. 8, 2020

(51) Int. Cl.
*G06N 20/00* (2019.01)
*G06N 3/084* (2023.01)
*G06N 3/126* (2023.01)
*G06N 20/20* (2019.01)

(52) U.S. Cl.
CPC .................. *G06N 3/126* (2013.01)

(58) Field of Classification Search
CPC ............... G06N 3/126; G06N 3/08
USPC ..................... 706/1–62
See application file for complete search history.

(56) References Cited

U.S. PATENT DOCUMENTS

| | | | | |
|---|---|---|---|---|
| 10,339,411 B1 * | 7/2019 | Hua | | G06T 17/20 |
| 2004/0230420 A1 * | 11/2004 | Kadambe | | G10L 15/07 |
| | | | | 704/E15.011 |
| 2013/0082870 A1 * | 4/2013 | Chambers | | G01S 13/003 |
| | | | | 342/25 A |
| 2013/0191088 A1 * | 7/2013 | Wells | | G06F 16/634 |
| | | | | 703/2 |
| 2014/0188768 A1 * | 7/2014 | Bonissone | | G06N 20/20 |
| | | | | 706/12 |
| 2017/0013191 A1 * | 1/2017 | Saad | | G06V 20/35 |
| 2017/0091627 A1 * | 3/2017 | Terrazas | | G06F 16/29 |
| 2017/0316281 A1 | 11/2017 | Criminisi | | |
| 2017/0330058 A1 * | 11/2017 | Silberman | | G06Q 10/067 |
| 2018/0005136 A1 | 1/2018 | Gai | | |
| 2018/0018590 A1 * | 1/2018 | Szeto | | G06F 21/6254 |

(Continued)

FOREIGN PATENT DOCUMENTS

| | | |
|---|---|---|
| DE | 202017102381 U1 | 6/2017 |
| GB | 2507217 A | 4/2014 |
| WO | 2018005001 A1 | 1/2018 |

OTHER PUBLICATIONS

Correia-Silva et al., "Copycat CNN: Stealing Knowledge by Persuading Confession with Random Non-Labeled Data", arXiv:1806.05476v1 [cs.CV] Jun. 14, 2018, 8 pages.

(Continued)

*Primary Examiner* — Brandon S Cole
(74) *Attorney, Agent, or Firm* — Heather Johnston

(57) ABSTRACT

Implement one or both of processing of computer queries using machine learning models and/or generation of machine learning models in a computer system. A computer processor generates a plurality of stored machine learning models. A computer processor extracts a plurality of updated parameters sets from the plurality of stored machine learning models. A computer processor creates a new machine learning model based on the respective distribution of each parameter included in the plurality of updated parameters sets. A computer processor processes at least one new query using the new machine learning model.

20 Claims, 5 Drawing Sheets

(56) References Cited

U.S. PATENT DOCUMENTS

2018/0101537 A1* 4/2018 Govindarajan ... G06F 16/24578
2020/0320404 A1* 10/2020 Lutfi ..................... G06N 3/126

OTHER PUBLICATIONS

Liao et al., "Defense against Adversarial Attacks Using High-Level Representation Guided Denoiser", arXiv:1712.02976v1 [cs.CV] Dec. 8, 2017, 12 pages.

Tramer et al., "Stealing Machine Learning Models via Prediction APIs", arXiv:1609.02943v2 [cs.CR] Oct. 3, 2016, 19 pages.

Wang et al., "Stealing Hyperparameters in Machine Learning", arXiv:1802.05351v2 [cs.CR] Feb. 20, 2018, 17 pages.

Wang et al., "With Great Training Comes Great Vulnerability: Practical Attacks Against Transfer Learning", USENIX Security 2018, Baltimore, MD, USA, Aug. 2018, 17 pages.

Zantedeschi et al., "Efficient Defenses Against Adversarial Attacks", arXiv:1707.06728v2 [cs.LG] Aug. 30, 2017, 16 pages.

Abadi et al., "Learning to Protect Communications With Adversarial Neural Cryptography", Under review as a conference paper at ICLR 2017, 15 pages.

Vidnerova et al., "Evolutionary generation of adversarial examples for deep and shallow machine learning models", MISNC, SI, DS '16, Aug. 15-17, 2016, Union City, NJ, USA, DOI: http://dx.doi.org/10.1145/2955129.2955178, 7 pages.

* cited by examiner

CONSTRUCTION OF A MACHINE LEARNING MODEL

BACKGROUND OF THE INVENTION

Machine learning models have value in many types of computing scenarios. Machine learning models (which can include deep learning models) may be used to perform predictions related to the processing of natural language and image queries. Under certain circumstances, third parties may be able to reverse engineer a given machine learning model.

SUMMARY

According to a first aspect of the present invention, there is provided a computer implemented method, the method comprising: generating, by at least one computer processor, a plurality of stored machine learning models; extracting, by the at least one computer processor, a plurality of updated parameters sets from the plurality of stored machine learning models; creating, by the at least one computer processor, a new machine learning model based on the respective distribution of each parameter included in the plurality of updated parameters sets; and processing, by the at least one computer processor, at least one new query using the new machine learning model.

Another aspect of the invention provides a computer program product embodied as program instructions stored on a computer readable storage medium. The program instructions comprising instructions to cause a computing device to perform a method, the method comprising: generating, by at least one computer processor, a plurality of stored machine learning models; extracting, by the at least one computer processor, a plurality of updated parameters sets from the plurality of stored machine learning models; creating, by the at least one computer processor, a new machine learning model based on the respective distribution of each parameter included in the plurality of updated parameters sets; and processing, by the at least one computer processor, at least one new query using the new machine learning model.

Another aspect of the invention provides a computer system. The computer system including program instructions stored on a computer readable storage medium that, when executed by the computer system, causes the computer system to perform a method, the method comprising: generating, by at least one computer processor, a plurality of stored machine learning models; extracting, by the at least one computer processor, a plurality of updated parameters sets from the plurality of stored machine learning models; creating, by the at least one computer processor, a new machine learning model based on the respective distribution of each parameter included in the plurality of updated parameters sets; and processing, by the at least one computer processor, at least one new query using the new machine learning model.

Still yet, any of the components of the present invention could be deployed, managed, serviced, etc., by a service provider who offers to implement one or both of processing of computer queries using a machine learning model and/or generation of machine learning models in a computer system. Embodiments of the present invention also provide and encompass related systems, methods, and/or program products.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings.

Preferred embodiments of the present invention will now be described, by way of example only, with reference to the following drawings, in which.

DETAILED DESCRIPTION

The present invention relates to a computer implemented method, data processing system, and computer program product for creating a machine learning model that is protected from reverse engineering.

Machine learning models (which include deep learning models) are used to perform predictions on, for example, natural language and images. In order to correctly train machine/deep learning models, a large volume of data is used. This data can be proprietary and have value to competitors. Embodiments recognize that querying certain machine learning models may allow a third party to extract the parameters of the machine learning model. Embodiments recognize that by repeating this process of extracting the parameters of the machine learning model may allow a third party to extract enough information to reverse engineer the parameters that govern how the machine leaning model operates. This means third parties can over time extract the value of a given machine learning model and create their own version of that machine learning model to use or sell. Embodiments provide a machine learning model that leverages a set of parameters for machine learning that evolve over time. Embodiments recognize that such an evolution increases the difficulty associated with extracting enough information to reverse engineer the parameters that govern how the machine leaning model operates.

Figure 1:
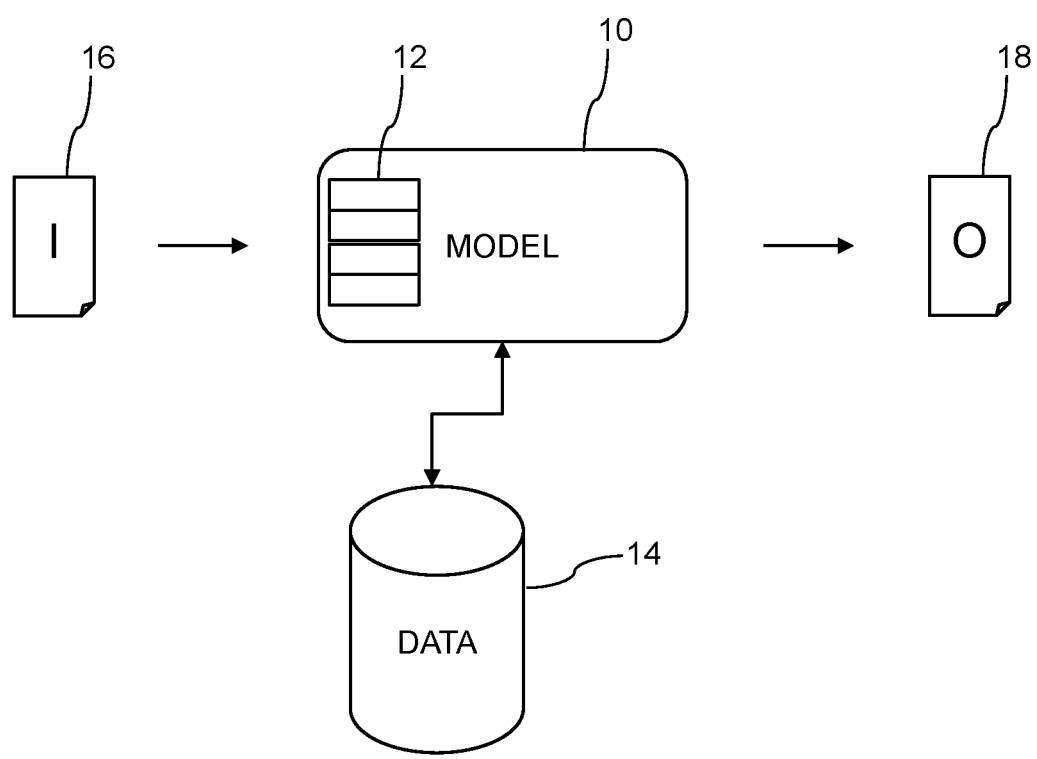
FIG. 1 is a schematic diagram of a machine learning model environment, in accordance with an exemplary embodiment of the present invention.

FIG. 1 shows a machine learning for an improved neural network model 11. The improved neural network model 11 comprises a set of parameters 12, which can be a combination of weights and biases and other numerical data structures such as functions. The machine learning of the improved neural network model 11 is trained across a defined dataset 14 such that when the improved neural network model 11 is used, a query 16 will produce an output 18 from the improved neural network model 11. The improved neural network model 11 could be used, for example, but is not limited to, to determine whether a photograph is either a cat or a dog. In this case, each query 16 will be in the form of an image file and the output 18 will be in the form of a natural language statement such as "dog", "cat" or "don't know". Affirmative answers may also include a statistical percentage representing the certainty of the answer.

In this example, the dataset 14 will comprise a large number of pre-existing image files of cats and dogs that are already labelled correctly as cats and dogs. The parameters 12 will include a large number of variables relating to colors and collections of pixels within images and so on, which can be used by the improved neural network model 11 to make a determination, with a high degree of certainty, as to whether a new image shows a cat or dog. The machine learning of the improved neural network model 11 works through the image files in the dataset 14, updating the parameters 12 until these parameters 12 can be relied upon, to a satisfactory extent, to return a correct output 18 in the future.

The machine learning of improved neural network model 11 that has been created by the process of updating the parameters 12 over the dataset 14 can have significant commercial value. Any kind of data can be processed using a machine learning of improved neural network model 11 and the parameters 12 that make up a given improved neural network model 11 that is being used in a commercially valuable or sensitive area may have significant value. This value is an asset that is, in general, viewed as worth protecting. Third parties may try to work out the values of the parameters 12 in the improved neural network model 11, particularly by repeatedly querying the improved neural network model 11 and attempting to calculate the parameters 12 from the outputs 18 returned from the queries 16, essentially attempting to reverse engineering the contents of the improved neural network model 11. Such efforts may be successful with conventional neural networks, such as the conventional neural network illustrated in FIG. 2.

However, the machine learning of improved neural network model 11 is constructed so that improved neural network model 11 is protected from this kind of discernment. This protection is achieved, at least in part, by the fact that the updated parameters 12, that are stored within the improved neural network model 11, are represented as distributions of values rather than specific individual values. Each parameter 12 in the improved neural network model 11 is stored as a distribution, preferably with the mean and standard deviation of the parameter also stored as part of the parameter distribution.

The machine learning of improved neural network model 11 thus is protected by using statistical distributions as model parameters (example parameters are weights and biases in neural networks). By using a distribution instead of a fixed value for these parameters 12, the improved neural network model 11 ensures that no two calls use the exact same set of model parameters 12. This helps assure that if a third party attempts to extract information about the relationship between the input query 16 and output 18, which is the result generated by processing query 16, then that third party would not receive a consistent response and would not be able to reconstruct the improved neural network model 11 from the outputs received. However, the results returned by the improved neural network model 11 would still be accurate to an acceptable degree, given that the mean and standard deviation of the parameters 12 are within a reasonable range, and also given that improved neural network model 11 is trained a sufficient number of times to achieve these parameters 12.

This approach can also be used to mitigate the effect of attempts by third parties to reverse engineer or otherwise discern the machine learning of a given improved neural network model 11. By not having one set of defined parameters 12 but rather a distribution, an attempt to reverse engineer improved neural network model 11 might pollute the improved neural network model 11 on one call but not on every call. This is because such attempts at reverse engineering typically involve adding (undetectable) noise to the input data of query 16, which adversely affects the output 18. However, in contrast to a conventional neural network model, since the improved neural network model 11 does not define the model parameters 12 until runtime, it would not be possible to find an adversarial noise to affect all the probability distribution of the parameters 12.

Figure 2:
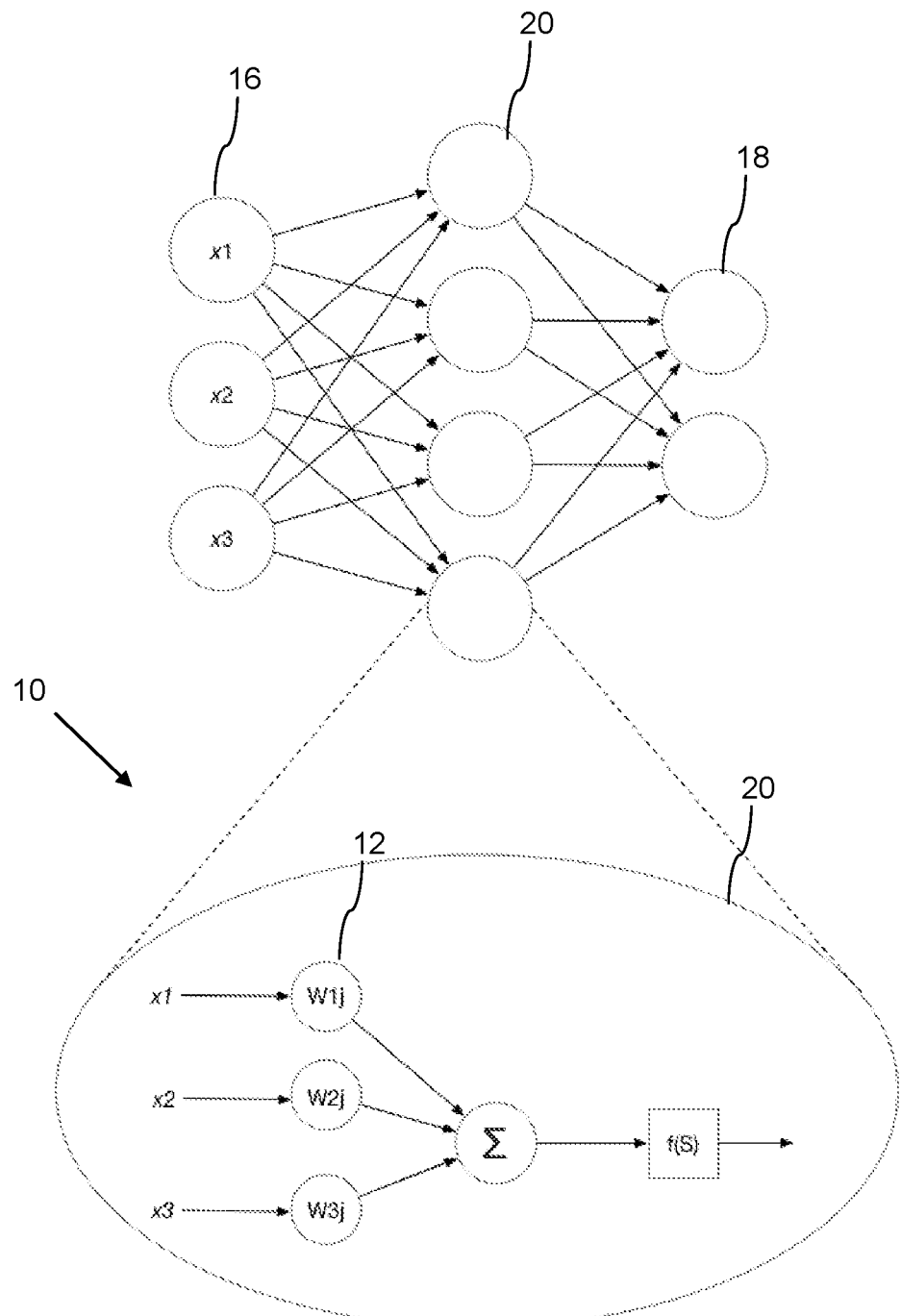
FIG. 2 is a schematic diagram of a conventional machine learning model.

FIG. 2 shows an example of a conventional neural network model 10. The conventional neural network model 10 consists of a set of layers with each layer being made up of several perceptron 20. In a typical neural network model 10, the perceptron 20 is defined using at least a set of definite weights (shown as w1, w2, w3) computed during the training of the conventional neural network model 10.

Figure 3:
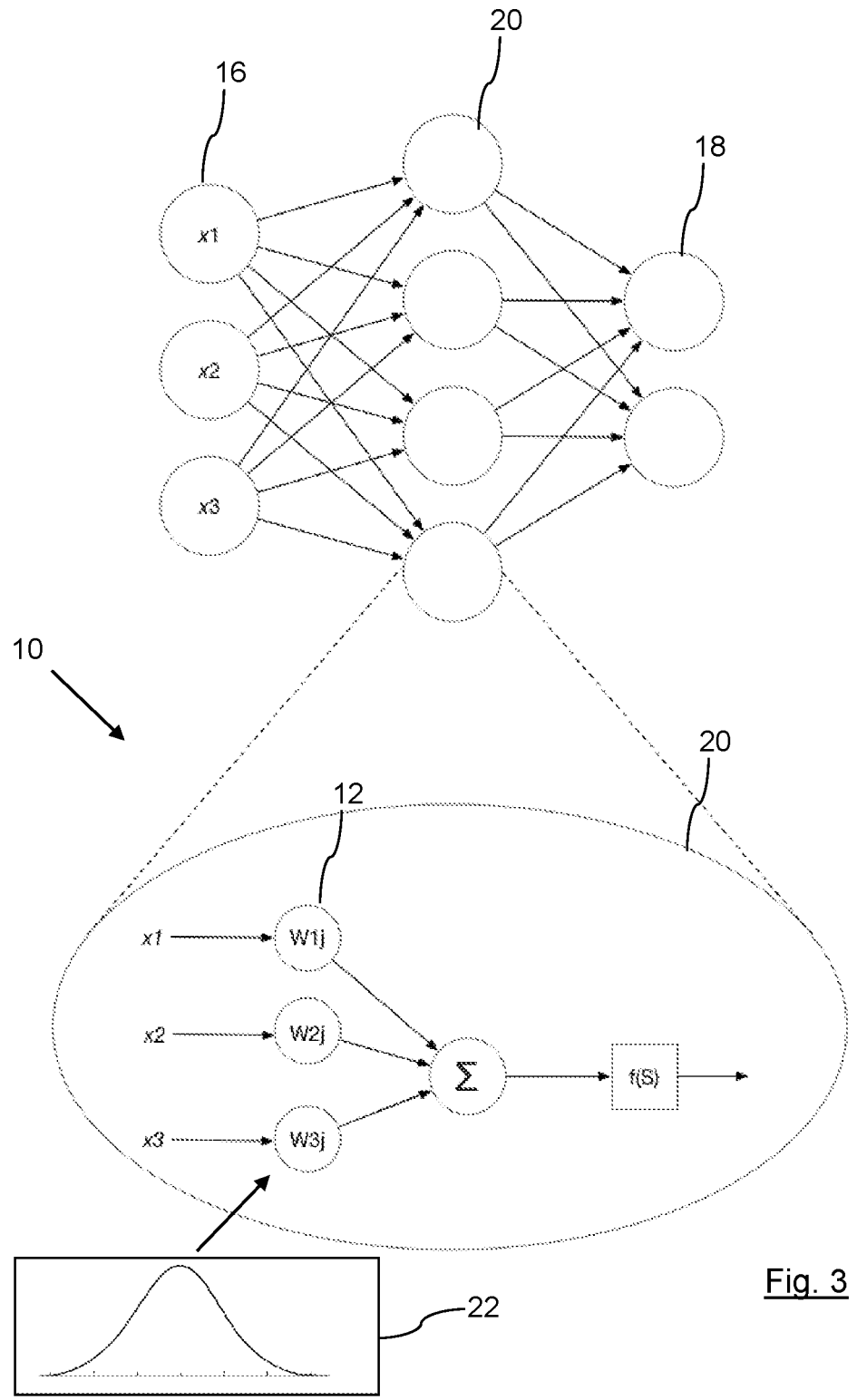
FIG. 3 is a schematic diagram of an improved machine learning model, in accordance with an exemplary embodiment of the present invention.

In contrast, the improved neural network model 11, as shown in FIG. 3, weights are replaced by a distribution 22 of possible values to protect the improved neural network model 11 from possible attempts to discern the machine learning of a given improved neural network model 11 and protect the intellectual property of a given improved neural network model 11.

Since multiple training runs of machine learning are utilized to generate improved neural network model 11, those training runs never produce exactly the same model parameters 12 (since the weights and biases are often randomly or pseudo-randomly initialized). This is leveraged to generate a distribution 22 of possible model parameters 12. Despite this variation of parameters 12, the different versions of the improved neural network model 11 can typically produce the same result and have similar accuracy. The training of many different versions of improved neural network model 11 typically involves larger data sets than normal and more training iterations, especially for more complex versions of improved neural network model 11. In most scenarios, the more versions of the improved neural network model 11, the larger the data sets needs to be to train them.

In the case of a given version of improved neural network model 11, the process would start by initializing weights and biases using a probability function, training the improved neural network model 11 (using for example back propagation), saving the improved neural network model 11 and repeating these three processes where for each iteration, with each successive resulting improved neural network model 11 being stored separately. For all the stored versions of the improved neural network model 11, the parameters (weights and biases) are extracted. This involves finding the mean for the weights of each perceptron 20, finding the standard deviation for the weights and biases of each perceptron 20 in each layer, identifying the distribution 22 using the mean and standard deviation for each perceptron 20 in each layer and saving the distribution 22 (with mean and standard deviation). The stored distributions 22 for each perceptron 20 define the new improved neural network model 11. The final part of the process of extracting the parameters 12 can be done in parallel to save time. In general, a new version of the improved neural network model 11 is generated based on the previous versions of the improved neural network model 11.

When calling the model, the approach at runtime would be to load the distributions 22 (with the mean and standard deviation) and find the expected value for each perceptron 20 using the distribution 22. This results in a defined set of parameters 12 (weights and biases) and then these parameters 12 are used to predict the desired values. This will produce different results for each call to the same input, however if trained on a large enough dataset and for a large enough number of times, the response would be still correct, especially if the response is a categorical response (for example in classification). This approach would often reduce the accuracy and increase the error in regression based models, however the absolute mean error would not vary significantly. The output can also be considered to be a distribution, defined by a mean and standard deviation to further protect the improved neural network model 11 from third party attempts to try to capture the output information.

Figure 4:
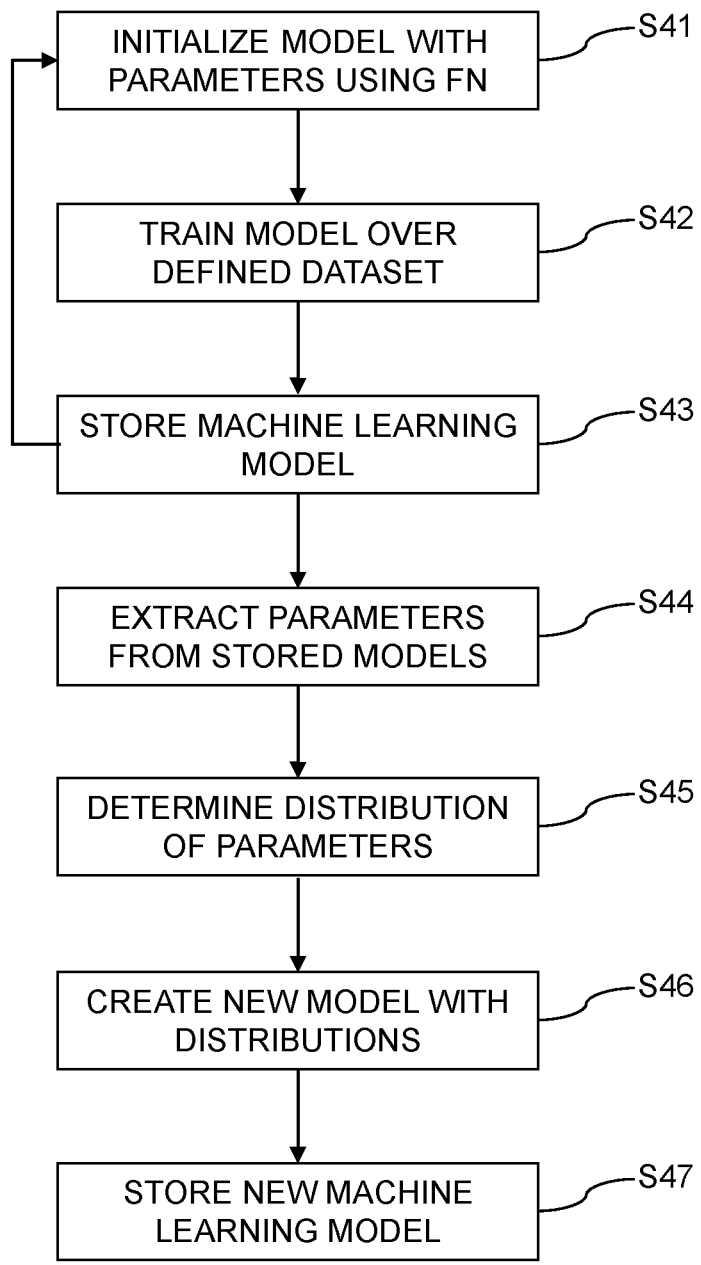
FIG. 4 is a flowchart of a method of creating a machine learning model, in accordance with an exemplary embodiment of the present invention.

FIG. 4 shows a flowchart of the method of creating the machine learning the improved neural network model 11. The first process of the method is process S41, which comprises initializing a set of parameters 12 for a set of initial neural network models from one or more probability functions (fn). The set of initial neural network models may include one or more previous versions of improved neural network model 11. These sets of parameters 12 control, in part, the machine learning for the respective initial neural network models. This is followed by process S42, which comprises training of the machine learning of initial neural network models across a defined dataset 14 to create sets of updated parameters 12. The next process is process S43, which comprises storing the machine learning of initial neural network models. The processes of S41 to S43 are now repeated a defined number of times, with the processes of initializing the set of parameters 12 and training and storing the machine learning of various versions of initial network models being repeated, as is indicated by the return arrow in the flowchart. In this embodiment, the processes of S41 to S43 are repeated a predetermined number of iterations, or until a predetermined number of initial neural network models are created, and then processing proceeds to process S44. Each initializing process results in a different set of starting parameters 12 (since a probability function is used to seed the parameter values) and this means that the updated parameters 12 of each completed version of improved neural network model 11 (after training) will have slightly different updated parameters 12.

The next process in the method is process S44, which comprises extracting from the stored machine learning, from the different versions of initial neural network models, each set of updated parameters 12. This is followed by process S45, which comprises determining the distribution 22 of each parameter 12 within the set of updated parameters 12. The next process in the method is process S46, which comprises creating a new machine learning, for a new version of improved neural network model 11. The new machine learning is based on the distribution 22 of each parameter 12 within the set of updated parameters 12. The final process in the method is process S47, which comprises storing the new machine learning for that new version of improved neural network model 11. Each parameter 12 in this new machine learning for the new version of the improved neural network model 11 is therefore defined as a distribution of values rather than as an individual value, with the distribution 22 being generated from the different versions of the initial neural network models that were created in processes S41 to S43.

The flowchart of FIG. 4 defines a process that is in two parts. In the first part, which comprises processes S41 to S43, a defined dataset 14 is repeatedly processed by multiple different versions of an initial neural network model that are seeded with different sets of parameters 12 as defined by a probability function. In the second part, which comprises processes S44 to S47, the parameter 12 values are extracted from the resulting versions of the initial neural network model in order to create a distribution of those parameters 12 and these distributions are used to create new machine learning for an improved neural network model 11. The resulting new machine learning for the new version of improved neural network model 11 is anticipated to be more resilient to attempts, by third parties, that are designed to determine the parameter values that are contained within the new version of improved neural network model 11, when compared to a machine learning model that contains specific parameter values, such as, for example, the conventional neural network model 10 of FIG. 2.

When a query 16 is received for the new machine learning of the new version of improved neural network model 11, the distributions 22 for each parameter 12 of the updated set of parameters 12 are accessed, and a value from each distribution 22 for each parameter 12 is selected. An output 18 is determined for the received query 16 according to the selected values for each parameter 12. At runtime, when the new machine learning of the new version of improved neural network model 11 is queried in the normal manner, actual values for each parameter 12 are generated at that time and the output 18 from the new version of improved neural network model 11 is determined according to the current specific values of the parameters 12. When each new query 16 is received by the new version of improved neural network model 11, a new value for each parameter 12 is calculated from the distributions stored in that version of improved neural network model 11. Therefore, at runtime, the new machine learning for a given improved neural network model 11 operates as if the parameter values are specific single values for the purpose of generating an output 18 for a received query 16. Each time a new query 16 is received, a new value for each parameter 12 is generated from the respective distribution 22 stored in the given improved neural network model 11 for that parameter 12.

In one embodiment of the system, the determining of the distribution 22 of each parameter 12 of the set of updated parameters 12 comprises determining the mean and standard deviation of each parameter 12 of the set of updated parameters 12. The mean and standard deviation of each parameter 12 can be calculated using normal statistical techniques. Therefore, the creating of a new machine learning for a given improved neural network model 11, comprising the distribution 22 of each parameter 12 of the set of updated parameters 12, includes the determined mean and standard deviation of each parameter 12 of the set of updated parameters 12. In one embodiment, the selecting of a value from each distribution 22 for each parameter 12 comprises generating a value for each parameter 12 according to a function of the determined mean and standard deviation for the respective parameter 12.

In one embodiment, the distribution 22 of each parameter 12 that is stored in the new version of improved neural network model 11 includes the mean and the standard deviation of the parameter 12 in question. When, at runtime, a value needs to be calculated for each parameter 12, then the parameters 12 can be modelled as, for example, a normal distribution and a suitable function can be used to select a value for that parameter 12. This means that in general the values for each parameter 12 that are selected will be close to the mean of the distribution 22. However, the occasional value selected will be further away from the mean. In some embodiments, the standard deviation controls the margin of error from the mean. The generation of each value for the parameters 12 at runtime can therefore be capped by the standard deviation (or a function of the standard deviation) in order to avoid the possibility of a value being returned for a parameter 12 that is too far from the mean for that parameter 12.

Figure 5:
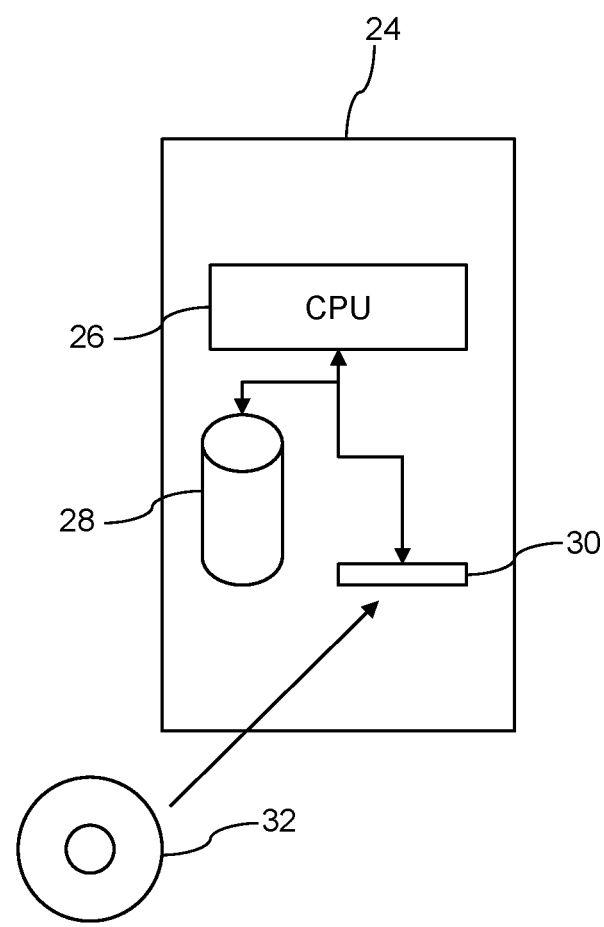
FIG. 5 is a schematic diagram of a data processing system, in accordance with an exemplary embodiment of the present invention.

FIG. 5 shows a schematic diagram of one embodiment of a data processing system 24, which can be used to create and operate the new machine learning of a given improved neural network model 11. The data processing system 24 comprises a processor 26, which is controlling the operation of the data processing system 24. The processor 26 of the data processing system 24 is also connected to a local storage device 28 and to a local interface 30. A computer readable storage medium 32 is provided, which may be, as non-limiting examples a CD-ROM or a flash memory device, that stores computer instructions that can be used to control the processor 26 to operate the data processing system 24 in accordance with an embodiment of the present invention. The processor 26 executes the instructions included in computer readable storage medium 32 to operate the data processing system 24.

The data processing system 24 can be operated by the processor 26 to perform the processes shown in FIG. 4. The data processing system 24 will create multiple machine learning models from a defined dataset 14, by using a probability function to seed different values for the parameters 12 of these models and then training the multiple machine learning models over the dataset 14. The data processing system 24 will then extract the parameter values from the stored machine learning models and calculate distributions for those parameters 12. A new machine learning for an improved neural network model 11 is created that includes the distributions 22 of the updated parameters 12 and this is stored in the data processing system 24.

The data processing system 24 can receive queries 16 for the new machine learning of improved neural network model 11 and generate outputs 18 accordingly. To do this, the data processing system 24, at runtime, accesses the distribution 22 of values for each parameter 12 of the new machine learning of improved neural network model 11 and calculates a specific value for each parameter 12 in turn from the distribution 22 of values. Each time this process is performed, a different set of parameter values are generated. The new machine learning of improved neural network model 11 then uses the specific parameter values that have been created to generate the output 18 for the received query 16. This creation of a new machine learning for a given improved neural network model 11 and parameter generation at runtime protected the improved neural network model 11 from attempts that are designed to determine the parameter values within the improved neural network model 11.

In one embodiment, a computer implement one or both of processing of computer queries and/or generation of machine learning models in a computer system.

In one embodiment, a computer generates a plurality of stored machine learning models. The computer extracts a plurality of updated parameters sets from the plurality of stored machine learning models. The computer creates a new machine learning model based on the respective distribution of each parameter included in the plurality of updated parameters sets. The computer processes at least one new query using the new machine learning model.

In one embodiment, a computer generates a given machine learning model of the plurality of stored machine learning models by: initializing a set of parameters for a machine learning model from a probability function; and training, by the at least one computer processor, the machine learning model across a defined dataset to create a set of updated parameters. The computer determines the respective distribution of each parameter included in the plurality of updated parameters sets based, at least in part, on at least one parameter included in the given machine learning model.

In one embodiment, determination of a respective distribution of each parameter of the set of updated parameters comprises: determining, by a computer, the mean and standard deviation of each parameter of the set of updated parameters.

In one embodiment, creation of a new machine learning model comprises: determining, by a computer, respective distributions for each parameter of the set of updated parameters based, at least in part on the determined mean and standard deviation of each parameter of the set of updated parameters.

In one embodiment, a computer receives a query for the new machine learning model. The computer accesses the distributions for each parameter of the updated set of parameters. The computer selects a value from each distribution for each parameter. The computer determines an output for the received query according to the selected values for each parameter.

In one embodiment, selecting a value from each distribution for each parameter includes generating a value for each parameter according to a function of the determined mean and standard deviation for the respective parameter.

In one embodiment, the parameters for the machine learning model comprise a set of weights and biases applied to process, at least in part, a database query.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method, the method comprising:
    obtaining, by at least one computer processor, a plurality of stored machine learning models;
    extracting, by the at least one computer processor, a plurality of updated parameters sets from the plurality of stored machine learning models, wherein the plurality of updated parameter sets includes a standard deviation weight parameter and a standard deviation bias parameter;
    representing, by the at least one computer processor, individual parameter values as parameter distributions, wherein the parameter distribution is based on a mean of the individual parameter values and a standard deviation of the individual parameter values;
    creating, by the at least one computer processor, a new machine learning model based on a respective distribution of each parameter included in the plurality of updated parameters sets;
    protecting, by the at least one computer processor, the new machine learning model from reverse engineering by basing the new machine learning model on the respective distribution of each parameter to protect each parameter included in the plurality of updated parameter sets from extraction; and
    processing, by the at least one computer processor, at least one new query using the new machine learning model.

2. The method of claim 1, the method comprising:
    generating, by the at least one computer processor, a given machine learning model of the plurality of stored machine learning models by:
        initializing, by the at least one computer processor, a set of parameters for a machine learning model from a probability function; and
        training, by the at least one computer processor, the machine learning model across a defined dataset to create a set of updated parameters; and
    determining, by the at least one computer processor, the respective distribution of each parameter included in the plurality of updated parameters sets based, at least in part, on at least one parameter included in the given machine learning model.

3. The method of claim 2, wherein determination of the respective distribution of each parameter of the set of updated parameters comprises:
determining, by the at least one computer processor, a mean and a standard deviation of each parameter of the set of updated parameters.

4. The method of claim 3, wherein creating a new machine learning model comprises:
determining, by the at least one computer processor, respective distributions for each parameter of the set of updated parameters based, at least in part on a determined mean and the standard deviation of each parameter of the set of updated parameters.

5. The method of claim 1, the method further comprising:
receiving, by the at least one computer processor, a query for the new machine learning model;
accessing, by the at least one computer processor, respective distributions for each parameter of the updated set of parameters;
selecting, by the at least one computer processor, a value from each distribution for each parameter; and
determining, by the at least one computer processor, an output for the query according to the selected values for each parameter.

6. The method of claim 5, wherein selection of a value from each distribution for each parameter is based on a value for each parameter that is generated according to a function of a determined mean and a standard deviation for a given parameter.

7. The method according to claim 1, wherein the parameters for the machine learning model comprise a set of weights and biases applied to process, at least in part, a database query.

8. A computer program product, the computer program product comprising a computer readable storage medium having program instructions embodied therewith, wherein the computer readable storage medium is not a transitory signal per se, the program instructions executable by a device to cause the device to perform a method comprising:
obtaining, by at least one computer processor, a plurality of stored machine learning models;
extracting, by the at least one computer processor, a plurality of updated parameters sets from the plurality of stored machine learning models, wherein the plurality of updated parameter sets includes a standard deviation weight parameter and a standard deviation bias parameter;
representing, by the at least one computer processor, individual parameter values as parameter distributions, wherein the parameter distribution is based on a mean of the individual parameter values and a standard deviation of the individual parameter values;
creating, by the at least one computer processor, a new machine learning model based on a respective distribution of each parameter included in the plurality of updated parameters sets;
protecting, by the at least one computer processor, the new machine learning model from reverse engineering by basing the new machine learning model on the respective distribution of each parameter to protect each parameter included in the plurality of updated parameter sets from extraction; and
processing, by the at least one computer processor, at least one new query using the new machine learning model.

9. The computer program product of claim 8, the method comprising:
generating, by the at least one computer processor, a given machine learning model of the plurality of stored machine learning models by:
initializing, by the at least one computer processor, a set of parameters for a machine learning model from a probability function; and
training, by the at least one computer processor, the machine learning model across a defined dataset to create a set of updated parameters; and
determining, by the at least one computer processor, the respective distribution of each parameter included in the plurality of updated parameters sets based, at least in part, on at least one parameter included in the given machine learning model.

10. The computer program product of claim 9, wherein determination of the respective distribution of each parameter of the set of updated parameters comprises:
determining, by the at least one computer processor, a mean and a standard deviation of each parameter of the set of updated parameters.

11. The computer program product of claim 10, wherein creating a new machine learning model comprises:
determining, by the at least one computer processor, respective distributions for each parameter of the set of updated parameters based, at least in part on the determined mean and the standard deviation of each parameter of the set of updated parameters.

12. The computer program product of claim 8, the method further comprising:
receiving, by the at least one computer processor, a query for the new machine learning model;
accessing, by the at least one computer processor, respective distributions for each parameter of the updated set of parameters;
selecting, by the at least one computer processor, a value from each distribution for each parameter; and
determining, by the at least one computer processor, an output for the query according to the selected values for each parameter.

13. The computer program product of claim 12, wherein selection of a value from each distribution for each parameter is based on a value for each parameter that is generated according to a function of a determined mean and a standard deviation for a given parameter.

14. The computer program product of claim 8, wherein the parameters for the machine learning model comprise a set of weights and biases applied to process, at least in part, a database query.

15. A computer system, the computer system comprising:
one or more computer processors;
at least one computer readable storage medium that is not a transitory signal per se; and
program instructions stored on the at least one computer readable storage medium, the program instructions being executable by at least one computer processor of the one or more computer processors to cause the at least one computer processor to perform a method comprising:
obtaining, by at least one computer processor, a plurality of stored machine learning models;
extracting, by the at least one computer processor, a plurality of updated parameters sets from the plurality of stored machine learning models, wherein the plurality of updated parameter sets includes a standard deviation weight parameter and a standard deviation bias parameter;

representing, by the at least one computer processor, individual parameter values as parameter distributions, wherein the parameter distribution is based on a mean of the individual parameter values and a standard deviation of the individual parameter values;

creating, by the at least one computer processor, a new machine learning model based on a respective distribution of each parameter included in the plurality of updated parameters sets;

protecting, by the at least one computer processor, the new machine learning model from reverse engineering by basing the new machine learning model on the respective distribution of each parameter to protect each parameter included in the plurality of updated parameter sets from extraction; and processing, by the at least one computer processor, at least one new query using the new machine learning model.

16. The computer system of claim 15, the method comprising:

generating, by the at least one computer processor, a given machine learning model of the plurality of stored machine learning models by:

initializing, by the at least one computer processor, a set of parameters for a machine learning model from a probability function; and training, by the at least one computer processor, the machine learning model across a defined dataset to create a set of updated parameters; and determining, by the at least one computer processor, the respective distribution of each parameter included in the plurality of updated parameters sets based, at least in part, on at least one parameter included in the given machine learning model.

17. The computer system of claim 16, wherein determination of the respective distribution of each parameter of the set of updated parameters comprises:

determining, by the at least one computer processor, a mean and a standard deviation of each parameter of the set of updated parameters.

18. The computer system of claim 17, wherein creating a new machine learning model comprises:

determining, by the at least one computer processor, respective distributions for each parameter of the set of updated parameters based, at least in part on the determined mean and the standard deviation of each parameter of the set of updated parameters.

19. The computer system of claim 15, the method further comprising:

receiving, by the at least one computer processor, a query for the new machine learning model;

accessing, by the at least one computer processor, respective distributions for each parameter of the updated set of parameters;

selecting, by the at least one computer processor, a value from each distribution for each parameter; and determining, by the at least one computer processor, an output for the query according to the selected values for each parameter.

20. The computer system of claim 19, wherein selection of a value from each distribution for each parameter is based on a value for each parameter that is generated according to a function of a determined mean and a standard deviation for a given parameter.

* * * * *